(12) United States Patent
Betancourt et al.

(10) Patent No.: US 7,761,786 B2
(45) Date of Patent: Jul. 20, 2010

(54) REUSABLE XPATH VALIDATION EXPRESSIONS

(75) Inventors: Melissa Betancourt, Miami, FL (US); David B. Lection, Raleigh, NC (US); Robert Edward Loredo, North Miami Beach, FL (US); Mircea P. Marandici, Boca Raton, FL (US); Alex Sanielevici, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1230 days.

(21) Appl. No.: 11/295,398

(22) Filed: Dec. 6, 2005

(65) Prior Publication Data

US 2007/0130504 A1    Jun. 7, 2007

(51) Int. Cl.
    *G06F 17/00*    (2006.01)
(52) U.S. Cl. .................. 715/236; 715/222; 715/221; 715/277
(58) Field of Classification Search ................. 715/236, 715/277, 221, 222
    See application file for complete search history.

(56) References Cited

U.S. PATENT DOCUMENTS

| | | | | |
|---|---|---|---|---|
| 7,086,042 | B2* | 8/2006 | Abe et al. ................... | 717/143 |
| 7,213,200 | B2* | 5/2007 | Abe et al. ................... | 715/230 |
| 7,251,782 | B1* | 7/2007 | Albers et al. ................ | 715/711 |
| 7,281,018 | B1* | 10/2007 | Begun et al. ................ | 707/102 |
| 7,315,981 | B2* | 1/2008 | Nakamura et al. .......... | 715/234 |
| 7,406,660 | B1* | 7/2008 | Sikchi et al. ................ | 715/234 |
| 7,451,392 | B1* | 11/2008 | Chalecki et al. ............. | 715/234 |
| 7,512,840 | B2* | 3/2009 | Martin et al. ................ | 714/38 |
| 7,516,399 | B2* | 4/2009 | Hsu et al. ................... | 715/234 |
| 2003/0149934 | A1* | 8/2003 | Worden ...................... | 715/513 |
| 2003/0163285 | A1* | 8/2003 | Nakamura et al. .......... | 702/179 |
| 2004/0003341 | A1* | 1/2004 | alSafadi et al. .............. | 715/500 |
| 2004/0010752 | A1 | 1/2004 | Chan et al. | |
| 2004/0019670 | A1 | 1/2004 | Viswanath | |
| 2004/0088652 | A1 | 5/2004 | Abe et al. | |
| 2004/0189708 | A1 | 9/2004 | Larcheveque et al. | |
| 2004/0205577 | A1* | 10/2004 | Abe et al. ................... | 715/513 |
| 2004/0226002 | A1 | 11/2004 | Larcheveque et al. | |
| 2004/0267813 | A1 | 12/2004 | Rivers-Moore et al. | |
| 2005/0028084 | A1 | 2/2005 | Dziejma | |
| 2005/0038868 | A1* | 2/2005 | Spicer ........................ | 709/217 |
| 2005/0050068 | A1 | 3/2005 | Vaschillo et al. | |

(Continued)

OTHER PUBLICATIONS

Robust Pinting by XPath Language: Authoring Support and Empirical Evaluation Author: Mari Abe, Masahiro Hori Date: 2003.*

(Continued)

*Primary Examiner*—Doug Hutton
*Assistant Examiner*—Mustafa Amin
(74) *Attorney, Agent, or Firm*—Patents on Demand, P.A.; Brian K. Buchheit

(57) ABSTRACT

A method for validating input received from an XML based form using reusable XPath validation expressions. The method can include a step of identifying a reusable XPath validation expression including at least one substitution marker. The substitution marker can be mapped to one or more values specific to an XML instance. At least one field to be validated with the reusable XPath validation expression can be designated utilizing the development tool. The development tool can automatically replace the substitution marker with the appropriate value specific to an XML instance.

14 Claims, 5 Drawing Sheets

U.S. PATENT DOCUMENTS

2005/0060317 A1    3/2005  Lott et al.
2005/0086581 A1*   4/2005  Bass et al. ............... 715/500.1
2005/0203747 A1*   9/2005  Lecoeuche ............... 704/270.1
2006/0074930 A1*   4/2006  Hsu et al. .................. 707/100
2007/0101280 A1*   5/2007  Paoli et al. ................. 715/762

OTHER PUBLICATIONS

Style stylesheets to extent XSLT, Part 2 Author: Joseph Kesselman Data: May 13, 2003.*

Title: XForms 1.0, W3C Recommendation Date: Oct. 14, 2003 url: <http://www.w3.org/TR/2003/REC-xforms- 20031014>.*

* cited by examiner

REUSABLE XPATH VALIDATION EXPRESSIONS

BACKGROUND

1. Field of the Invention

The present invention relates to the field of information technology and, more particularly, to reusable XPath validation expressions.

2. Description of the Related Art

XForms is a markup language specified by the World Wide Web Consortium (W3C) that is based upon an Extensible Markup Language (XML). XForms separates data logic of a form from its presentation. Data logic is handled by an XForms model and presentation is handled by an XForms user interface. An XForms model holds instance data and associated constraints. Instance data is an internal representation of data of the XForms model. An XForms model can hold more than one data instance. In other words, the XForms model defines what a form is, what data a form should contain, and how the data of a form should be handled.

In XForms, presentation is handled by an XForms user interface or other compatible user interface, such as a XML user interface configured to interoperate with an XForms model. That is, an XForms user interface handles the display and input of data. It should be noted that the term "XForms user interface" shall be used generically throughout this application to represent any XForms compliant user interface.

An XForms binding mechanism binds an XForms model with a corresponding XForms user interface. An XForms Submit Protocol defines how XForms sends and receives data between an XForms model and an XForms user interface.

XPath is a language that describes a way to locate and process items in XML documents by using an addressing syntax based on a path through the document's logical structure or hierarchy. XPath also provides basic facilities for manipulation of strings, numbers, and Booleans. XPath annotations or expressions can be attached to any node in an XForms data instance. Once attached to nodes, XPath expressions can provide a framework for supporting calculations, specific validations, read-only data, and visibility of controls. Accordingly, XPath expressions can be bound to XForms controls and can be used to validate and otherwise process information input into an XForms user interface and to process data output to the XForms user interface.

Current technologies for generating XPath expressions and binding these expressions to controls within an XForms user interface is complex and cumbersome to use. Often, form designers lack the programmatic expertise to construct XPath expressions and to integrate them into forms being designed. This usually means that XForms user interfaces are initially designed by a form designer. A programming specialist is needed to construct and integrate XPath validations and other expressions to the user interfaces after initial form design activity has been completed. This process can add substantial time and/or cost to a form design effort.

SUMMARY OF THE INVENTION

The present invention discloses a technology for generating reusable XPath validation expressions. Using the invention, one or more validation expressions written in the XPath language can be stored in a generic format. An XPath reusable validation expression can validate whether a credit card number, a user name, a password, and/or other user input is provided in a valid manner understandable by a software system. The generic format can be a format that is independent of any particular data instance or interface. In one embodiment, one or more substitution markers can be included within a reusable XPath validation expression, where each substitution marker is a place holding parameter for a segment of the XPath expression that links the expression to a node in a data instance and/or to a user interface field. Before the reusable XPath validation expression is utilized, the substitution markers can automatically be replaced with suitable values. For example, an XForms development tool configured to utilize reusable XPath validation expressions can replace the substitution markers with XForms data instance specific values bound to one or more user interface fields. The replacement of the substitution markers with specific values can occur after an XForms user interface has been generated by the development tool.

The present invention can be implemented in accordance with numerous aspects consistent with material presented herein. For example, one aspect of the present invention can include a method for validating XML based form fields. The method can include a step of identifying a reusable XPath validation expression including at least one substitution marker. The substitution marker can be mapped to one or more values. The values can be values specific to the development tool or specific to an XML instance. At least one field to be validated with the reusable XPath validation expression can be designated utilizing the development tool. The development tool can automatically replace the substitution marker with appropriate values.

Another aspect of the present invention can include a reusable XPath validation expression. The expression can include at least one expression segment, at least one substitution marker, and a return value. Each expression segment can contain logic for validating received input. The logic can be written in accordance within an XPath compliant language. Each substitution marker can be replaced with a location to a data instance element to be validated. The replacement can occur before received input is validated using the reusable XPath validation expression. The return value can indicate whether received input is successfully validated by the reusable XPath validation expression.

Still another aspect of the present invention can include an XForms design software application. The application can include an interactive interface and a validation data store. The interactive interface can be configured to generate a XML form compliant with the XForms language. The validation data store can include one or more reusable XPath validation expressions. A user can bind an input receiving field created with the interactive interface to a reusable XPath validation expression. This binding will cause input received within the bound field to be validated by the XPath reusable validation expression. The XForms design software application can automatically replace substitution markers contained within the selected reusable XPath validation expression with an appropriate XPath expression corresponding to the bound field. Consequently a user of the XForms design interface need not be familiar with the XPath language to utilize the pre-constructed reusable XPath validation expressions.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or in any other recording medium. The program can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention discloses reusable XPath validation expressions. The reusable XPath validation expressions can be constructed and placed in a data repository. When stored, the reusable XPath validation expressions can be in a generic format, which is not bound to any particular node or element of a XML document. Instead, the reusable XPath validation expressions can utilize one or more substitution markers in place of document specific information. During a software design phase of the software life cycle, the reusable XPath validations can be made available to a software design system, such as an XForms design system. A developer using the software design system can select a previously stored reusable XPath validation expression and can use the selected expression to validate a data field of a XML based document under development, the XML based document can be a document written in the XForms language.

During the software development process, the reusable XPath validations can remain in their generic format, where the software development system maps XML instance fields in a development interface to the substitution markers of the reusable XPath validations. When a final version of a XML instance is generated by the software development system, an instance specific XPath validation not having substitution markers can be automatically generated from the reusable XPath validation expression. The instance specific XPath validation expression can be placed within a suitable location of the constructed XML instance. In this manner, an XPath validation expression can be integrated with XML instance specific fields in a delayed fashion, meaning that the binding of the XPath validation expression to a data instance can be delayed until after a form has been produced.

Figure 1:
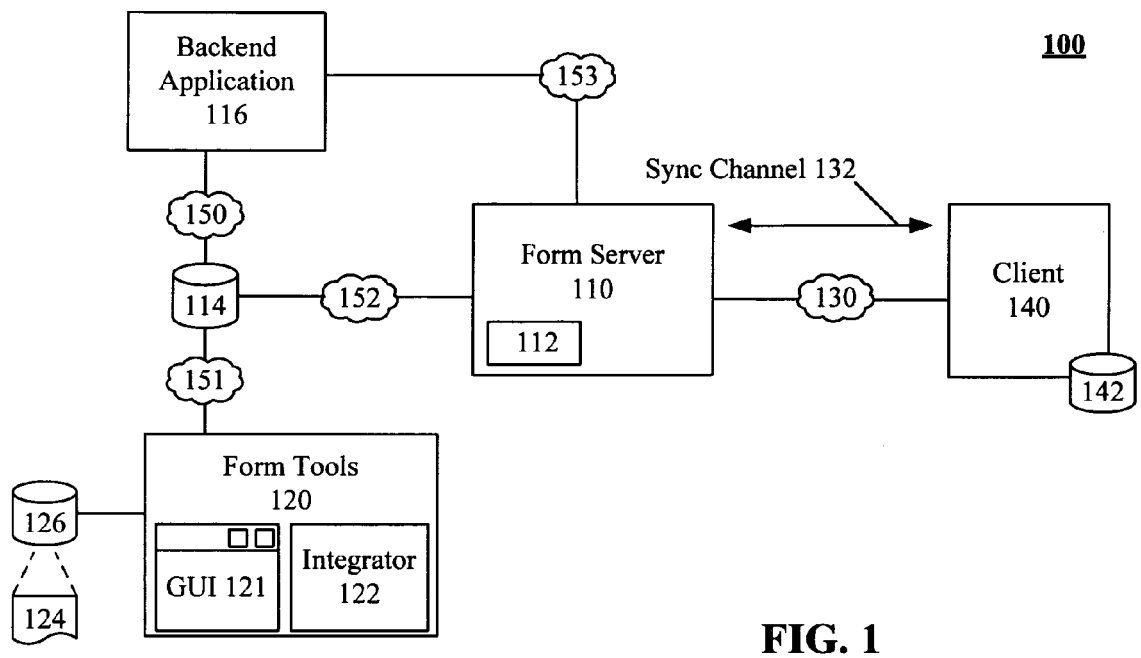
FIG. 1 is a schematic diagram of an XForms development system that includes re-usable XPath validations in accordance with an embodiment of the inventive arrangements disclosed herein.

FIG. 1 is a schematic diagram of XForms development and deployment system 100 that includes forms that utilize reusable XPath validations in accordance with an embodiment of the inventive arrangements disclosed herein. It should be appreciated that system 100 provided for illustrative purposes only and that the reusable XPath expressions can be utilized with other architectures, as should be readily apparent by one of ordinary skill in a computer technology field.

In system 100, form tools 120 can be used to develop a form application. During development, a designer can use a form creation graphical user interface (GUI) 121 that permits the designer to select one or more reusable XPath validation expressions 124 contained in validation store 126. An intermediate form of the reusable XPath validation expressions 124 can be used by the form tools 120 during development. The intermediate form of the reusable validation expression 124 retains a loose coupling between the validation expressions 124 and the documents or forms to which the validation expressions 124 are linked.

Once development of the XForms application is complete, an integrator 122 can convert the intermediate form of the validation expressions 124 to a final form if necessary, where the final form of the validation expression 124 includes an XPath validation expression specific to the data fields being validated. That is, the final form of the validation expression 124 can be properly linked to an XForms data instance that is bound to a user interface.

It should be appreciated that the intermediate form of the reusable XPath validation expression 124 is an optional step. In an alternative configuration of the invention, the form tools 120 can immediately insert data instance parameters specific to a XML instance to generate the final form of the XML instance without generating an intermediate form.

The developed XForm can be placed in a forms repository 114. The forms repository 114 can be accessed by a forms manager 112 of a form server 110. The form server 110 can administer or serve one or more XForms to one or more clients 140. A synchronization channel 132 can be established between Form server 110 and client 140. In one configuration, the synchronization channel 132 can conform to an XForms Submit Protocol. The client 140 can use client data store 142 that contains client specific form information. Data store 142 can be synchronized with data store 114 during the synchronization process, which makes new forms added to data store 114 since the last synchronization operation available to client 140.

Client 140 can open an XForms document using a client application, such as an XForms compliant browser. A user of client 140 can input requested data into a form and thereafter submit the form. The submitted information can be conveyed to form server 110. Form server 110 can receive the form data and provide the received data to one or more backend applications 116. The backend applications 116 can process the data and can responsively generate information, which is presented within client 140 after being conveyed through form server 110.

Client 140 can include any computing device capable of rendering an XForms compliant document. Since the XForms language is specifically designed to bifurcate data presentation from data logic, the XForms presentation or interface component can be one specifically tailored to the capabilities of client 140. For example, different XForms interfaces can be used for a client 140 which is a personal data assistant (PDA) or a smart phone than for a client 140 which is a desktop computer.

Data stores 114, 126, and/or 142 can be physically implemented within any type of hardware including, but not limited to, a magnetic disk, an optical disk, a semiconductor memory, a digitally encoded plastic memory, a holographic memory, or any other recording medium. Each of the data stores 114, 126, and/or 142 can be stand-alone storage units as well as a storage unit formed from a plurality of physical devices, which may be remotely located from one another. Additionally, information can be stored within each of the data stores 114, 126, and/or 142 in a variety of manners. For example, information can be stored within a database structure or can be stored within one or more files of a file storage system, where each file may or may not be indexed for information searching purposes.

Networks 130, 150, 151, 152, and 153 are used to communicatively link different components of system 100 to one another. Each of the networks 130, 150, 151, 152, and 153 can include any hardware/software/and firmware necessary to convey data encoded within carrier waves. Networks 130, 150, 151, 152, and 153 can include one or more personal area network (PAN), local area network (LAN), metropolitan area network (MAN), wide area network (WAN), virtual private network (VPN), and the like. Networks 130, 150, 151, 152, and 153 can each also include local components and data pathways necessary for communications to be exchanged among computing device components and between integrated device components and peripheral devices. Each of the networks 120, 150, 151, 152, and 153 can include line based and/or wireless communication pathways.

It should be appreciated that system represents one contemplated embodiment in which reusable XPath validations can be utilized and the invention is not to be construed as limited to details contained within this illustrative embodiment. That is, the present invention concerns the encoding of XPath based form validations into a reusable, generic format, with deferred integration of the XPath validation into an XForm. Any system that utilizes the reusable XPath validations as described herein is to be considered within the scope of the present invention.

Figure 2:
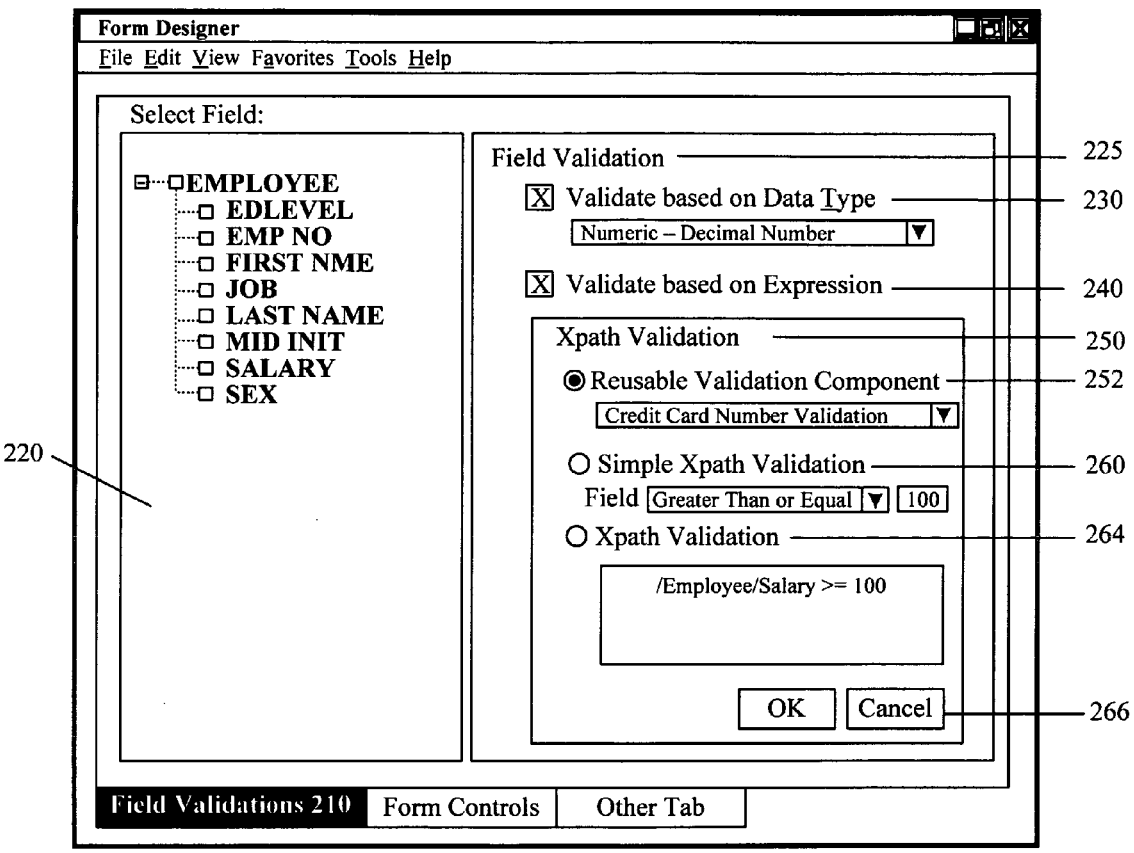
FIG. 2 is a sample graphical user interface (GUI) of a software design interface that utilizes re-usable XPath validations in accordance with an embodiment of the inventive arrangements disclosed herein.

FIG. 2 is a sample GUI 200 of a software design interface that utilizes reusable XPath validation expressions in accordance with an embodiment of the inventive arrangements disclosed herein. For example, GUI 200 can be one implementation of form creation graphical user interface (GUI) 121.

GUI 200 can include a field validation 210 section that presents one or more data fields within data field section 220. Data fields can be data fields for a data instance of an XForms model. Each of these data fields can be bound to one or more interface element of an XForms complaint user interface.

When a data field of data field section 220, such as a salary field, is selected, a corresponding validation property for the selected field can be presented in validation section 225. A number of options for validating fields can be provided including validations based upon data type 230 and validations based upon expressions 240. Validations based upon data types 230 can be linked to database fields, where the database performs the validations. Data type validations 230 can also be implemented by code contained within a user interface into which input is provided.

The validations based on expressions 240 can include validations based upon XPath expressions 250. XPath expressions 250 can be specified in any number of ways including, but not limited to, using textual entry section 264, using GUI section 260, and using reusable validation section 250.

Reusable validation section 250 can allow a designer to select one or more previously constructed re-usable validations 252, such as a validation for a credit card number entry. A designer can additionally construct a new reusable validation by selecting an expression creation option from within GUI 200. A user-constructed reusable validation can appear within a list of available reusable validations 252.

It should be appreciated that the GUI 200 is provided for illustrative purposes only and that the invention can be implemented in any of a variety of ways other than those illustrated in GUI 200. Use of alternative and derivative display elements, input field types, menus, tabs, windows, and the like are contemplated herein. Additionally, although a graphical interface is shown the concepts expressed by GUI 200 can be implemented within an interactive speech interface, a multimodal interface, a three-dimensional interface, and the like, by one of ordinary skill in the art without undue experimentation using techniques known in the art.

Figure 3:
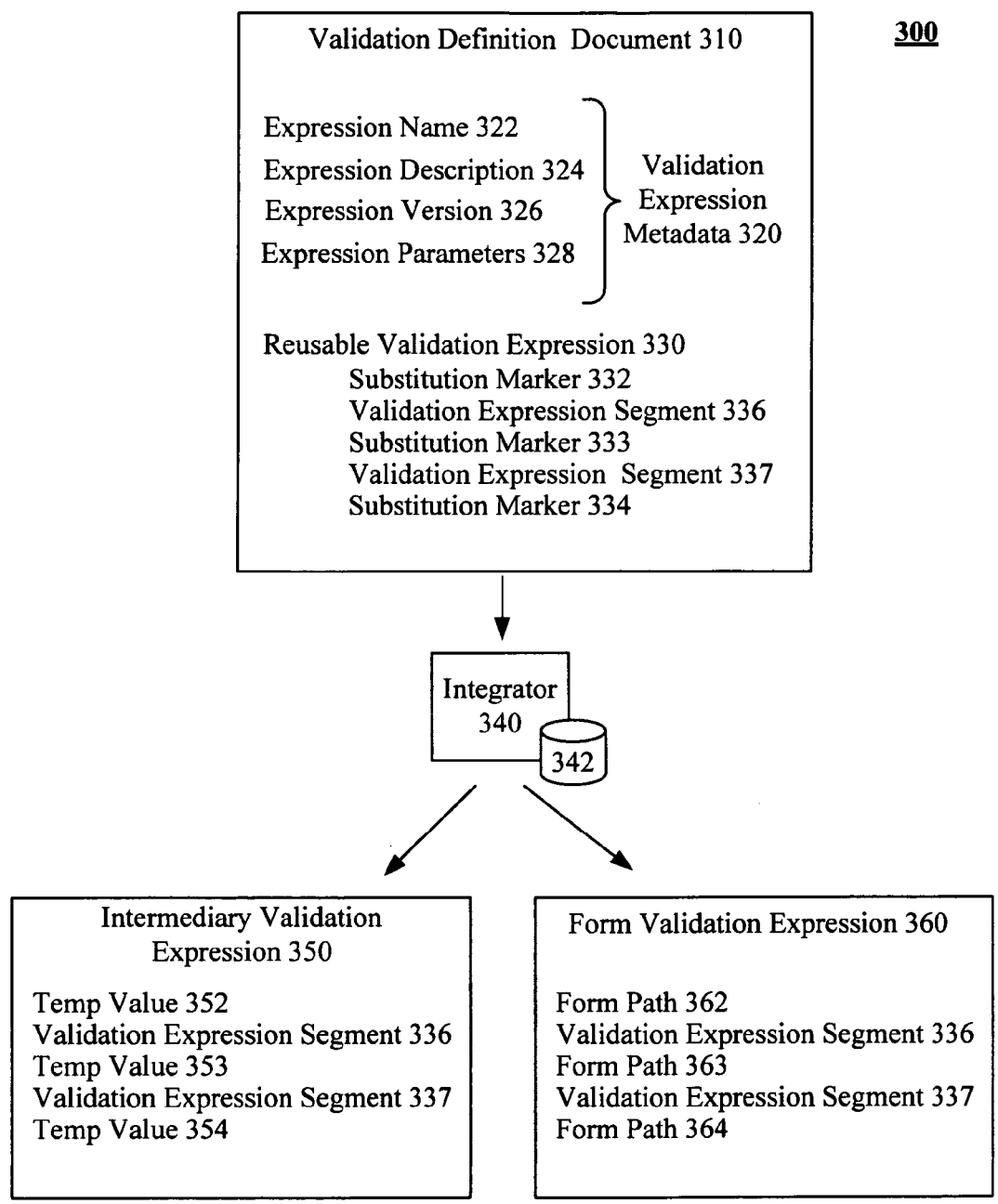
FIG. 3 is a schematic diagram of a system that illustrates a re-usable XPath validation in accordance with an embodiment of the inventive arrangements disclosed herein.

FIG. 3 is a schematic diagram of a system 300 that illustrates a re-usable XPath validation in accordance with an embodiment of the inventive arrangements disclosed herein. In one configuration, the re-usable XPath validations of system 300 can include the reusable validation 124 of system 100. System 300 is not to be construed as limited in this regard, however, and can be implemented in any system or architecture where XPath validation expressions can be utilized.

System 300 can include a validation definition document 310, which can include validation expression metadata 320 and associated reusable XPath validation expression 330. The validation definition document 310 can be a XML document.

The validation expression metadata 320 can include an expression name 322, and expression description 324, an expression version 326, expression parameters 328, and the like. In one embodiment, an individual or software program selecting expression 330 can use the metadata 320 to perform this selection. For example, a GUI interface configured to utilize reusable XPath validations can present the user with expression name 322 and expression description 324 for expression 330 and can present the equivalent information for other available reusable XPath validation expressions. The user can then select the expression by name and/or description.

Reusable XPath validation 330 can include one or more substitution markers, such as substitution marker 332, 333, and 334, and can include one or more validation expression segments, such as segments 336 and 337. The expression segments 336 and 337 can be the portion of expression 330 that remains unchanged regardless of the XML instance for which the expression 330 is used. The substitution markers 332, 333, and 334 can each represent a part of expression 330 that varies depending upon the XML instance for which the expression 330 is used.

Integrator 340 can use the validation definition document 310 to convert the reusable validation expression 330 into an intermediary validation expression 350 and/or into a form validation expression 360. Integrator 340 can use values contained in data store 342 to map the substitution markers 332, 333, and 334 to appropriate values.

Intermediary validation expression 350 is an expression where the generic form of reusable validation expression 330 is maintained. Form Validation expression 360 is an expression where the reusable validation expression 330 is customized for a particular XML instance, and is therefore no longer in a generic or independent form.

In the intermediary validation expression 350 one or more temporary values are used to replace the substitution markers. For example, temp value 352 can replace substitution marker 332, temp value 353 can replace substitution marker 333, and temp value 354 can replace substitution marker 334. The validation expression segments 336 and 337 remain unchanged.

In one embodiment, the temporary values can be values specific to a development tool or an active instance of a development tool. The development tool can register or publish these values to data store 342 so that proper mappings are possible. For example, the temporary values can be established for a new XForms user interface being developed. A developer can link reusable validation expressions to the XForms user interface using these temporary values, even before a data instance for the XForms model corresponding to the XForms user interface has been specified. Accordingly, the temp values 352, 353, and 354 can be used to defer the integration of the reusable XPath validation expression 330 until after an XForm has been completely developed.

In form validation expression 360, form paths or appropriate XPath values for a specific data instance can replace the substitution markers of the reusable XPath validation expression 330. Form path 362 can replace substitution marker 332, form path 353 can replace substitution marker 333, and form path 364 can replace substitution marker 334. The validation expression segments 336 and 337 in form validation expression 360 can remain unchanged.

It should be appreciated that XPath validation expressions are not generally implemented in a stand-alone fashion, but are included within a code segment of a XML document. Accordingly, intermediary validation expression 350 and/or form validation expression 360 can be a code segment integrated within a XML document. For example, the form validation expression 360 can be a validation expression contained within a XML document written in compliance with an XForms language.

Figure 4:
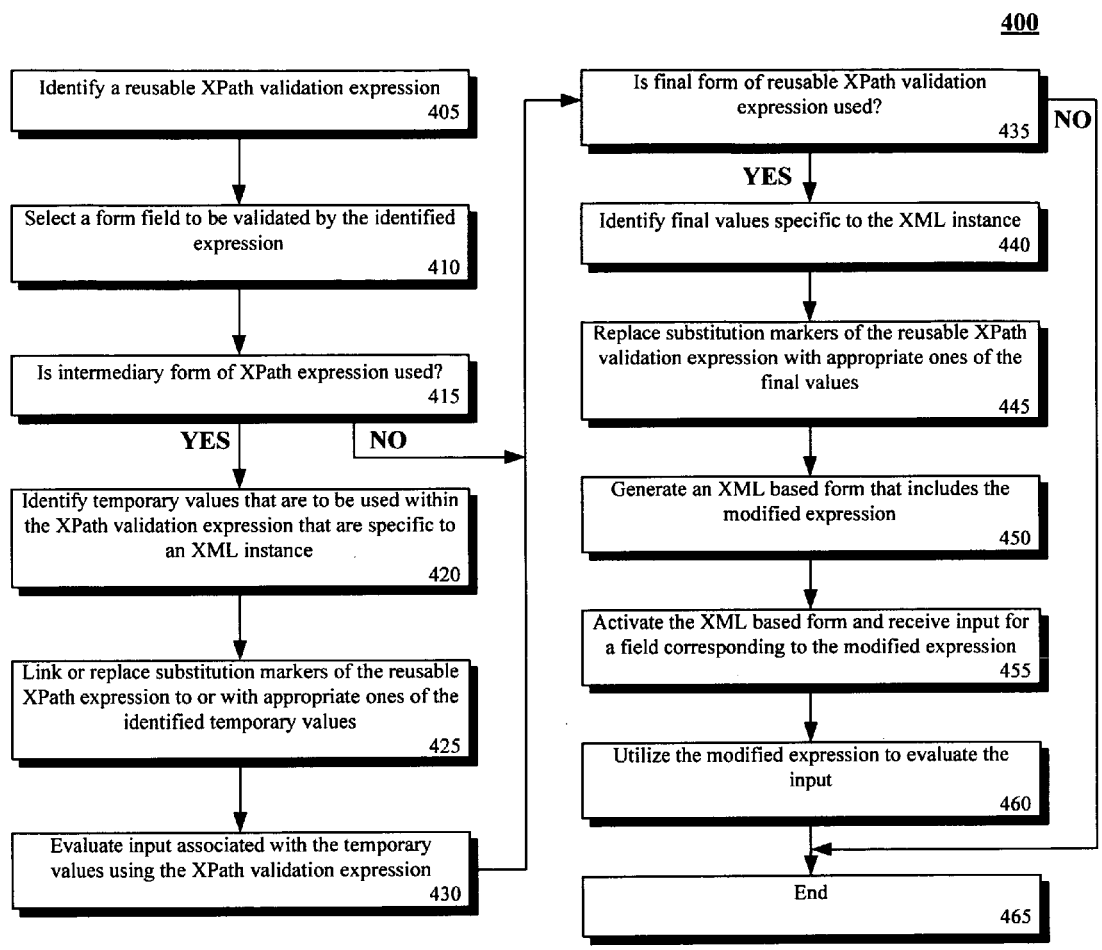
FIG. 4 is a flow chart of a method for utilizing a reusable XPath validation in accordance with an embodiment of the illustrative arrangements disclosed herein.

FIG. 4 is a flow chart of a method 400 for utilizing a reusable XPath validation in accordance with an embodiment of the illustrative arrangements disclosed herein. Method 400 can be performed in the context of any system in which reusable XPath validations are utilized. For example, method 400 can be performed in the context of system 100, a system using GUI 200, and/or a system 300 as disclosed herein.

Method 400 can begin in step 405, where a reusable XPath validation expression can be identified. For example, a user can select a reusable XPath validation from within an XForms development tool. In another example, an automated program can utilize a software tool to identity a previously stored reusable XPath validation expression. In step 410, a form field can be selected. The form field can be an input receiving field. Selecting the field indicates that field is to be validated using the identified XPath validation expression.

In step 415, a determination can be made as to whether an intermediary form of the XPath expression is to be used. An intermediary form can be any form of specifying variables used by the XPath validation expression that is not directly tied to a data node, yet which functions as a node designator. That is, the intermediary form is a form of the reusable XPath validation where the XPath validation expression remains in a generic form. Use of an intermediary form of the XPath expression is an optional step. If an intermediary form is not to be used, the method can progress to step 435. Otherwise, the method can proceed from step 415 to step 420.

In step 420, temporary values that are to be used within the XPath validation expression can be identified. In one embodiment, the temporary values can be values defined for a development tool. The temporary values can be values specific to the development tool that indicate a form field that is to be validated. It should be appreciated that the development tool can be an XForms based tool, and that XForms separates data logic (XForms model) from data presentation (XForms user interface).

Unlike typical fields referenced by XPath expressions, the selected field can be an interface field not yet linked to a data instance or to an XForms model. For design purposes, the temporary variables defined for the development tool can be used in lieu of a typical data node specification.

In step 425, substitution markers of the reusable XPath expression can be linked to appropriate ones of the temporary values. In one arrangement, the linkage can leave the reusable XPath expression unchanged. For example, to individually incomplete markup documents or fragment files can be used. One fragment file can contain the XPath expression with substitution markers. The other fragment file can contain the temporary values. An integrator of the development tool can dynamically combine these two fragment files to simulate a complete file or a complete markup document that includes a valid XPath validation expression. Alternatively, the development tool can replace directly splice the reusable XPath expression together with the temporary values into a XML document, thereby using a single file instead of two fragment files. In step 430, input associated with the temporary values can be evaluated using the XPath validation expression.

In step 435, a determination can be made as to whether a final form of the reusable XPath validation expression is to be used. A final form of the reusable XPath validation expression is a form of the expression that has been specifically linked to a data instance and is therefore no longer in a generic format. The reusable expression need not be placed in a final form to be utilized, as indicated by steps 420, 425, and 430. If no final form is to be used, the method can jump to step 465, where the method can finish processes related to the invention described herein.

In step 440, final values that are specific to a XML instance can be identified. This identification can be performed automatically by the XForms development tool. Moreover, the identification of the final values can occur after the field selected in step 410 has been bound to a data instance. In step 445, substitution markers of the reusable XPath validation expression can be replaced with appropriate ones of the final values. For example, a path specifying the proper element of an XForms model bound to the designated field can replace a corresponding substitution marker. In step 450, a XML based form, such as an XForms based form, can be generated. The generated form can include the modified XPath validation expression that includes XML instance specific values. In step 455, the XML based form can be activated or used. Input can be received though the form that relates to the designated field. In step 460, the modified XPath validation expression can be used to evaluate or validate the input.

Method 400 can end in step 465. It should be appreciated that method 400 can be an encoded in a set of machine readable instructions, of which method 400 is only a subset. Therefore, when the method 400 ends in step 465, other computer processing related to the XPath, the development tool, and/or a generated form can be performed. Additionally, the method 400 can be repeated for a new reusable XPath validation expression and therefore can loop from step 460 to step 405 (not shown).

Figure 5:
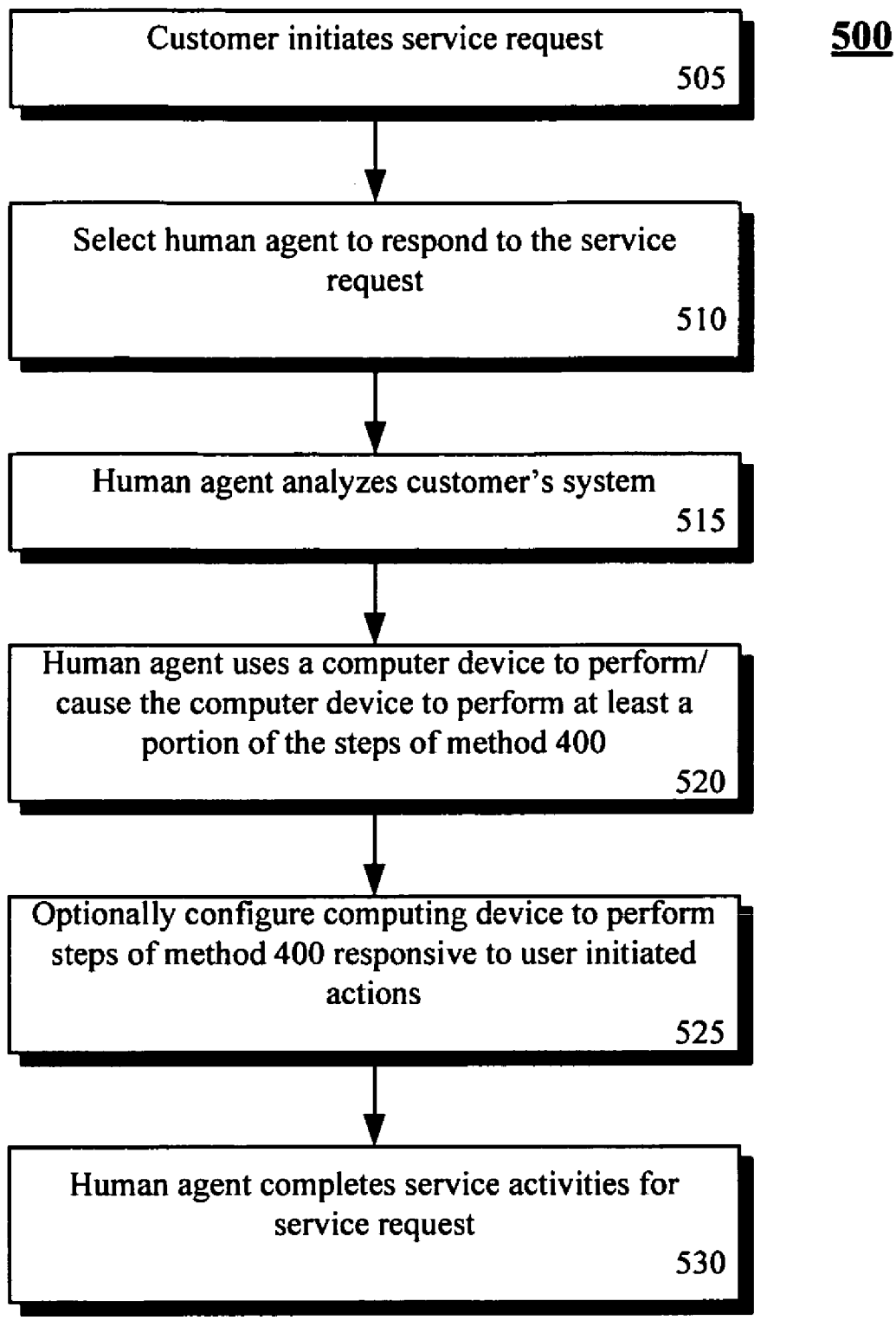
FIG. 5 is a flow chart of a method showing a manner in which a service agent can implement reusable XPath expressions for a development tool or can cause a system to utilize a reusable XPath expression in accordance with an embodiment of the illustrative arrangements disclosed herein.

FIG. 5 is a flow chart of a method 500 showing a manner in which a service agent can implement reusable XPath expressions for a development tool or can cause a system to utilize a reusable XPath expression in accordance with an embodiment of the illustrative arrangements disclosed herein. For example, the service agent can setup, troubleshoot, or configure system 100 so that the system 100 is capable of performing steps of method 400.

Method 500 can begin in step 505, when a customer initiates a service request. The service request can be related to reusable validation expressions. For example, the customer can purchase an XForms development tool configured to utilize the reusable XPath validation expressions. The service request can be a request to initially configure the development tool containing the reusable XPath validation expressions. The service request can also be a request for the service agent to construct a custom set of reusable XPath validation expressions. In step 510, a human agent can be selected to respond to the service request.

In step 515, the human agent can analyze a customer's system and can determine the steps necessary to satisfy the service request, which can include performing one or more of the steps detailed in method 400. In step 520, the human agent can use one or more computing devices to perform or to cause the computing device to perform the steps of method 400. Appreciably, the one or more computing devices used by the human agent can include the customer's computer, a mobile computing device used by the human agent, a networked computing device, and combinations thereof.

In optional step 525, the human agent can configure the customer's computer in a manner that the customer or clients of the customer can perform one or more steps of method 400 in the future. In step 525, the human agent responding to the service request may or may not actually perform each of the steps indicated in method 400, but may instead configure the customer's system so that others can perform these steps. For example, the human agent can install software that includes the reusable XPath validations, such as the previously mentioned XForms development tool, so that a forms developer can use the software. Use of the software can result in a forms developer performing the steps of method 400. In step 530, the human agent can complete the service activities having resolved the matter for which the service request was submitted.

It should be noted that while the human agent may physically travel to a location proximate to a customer's computer, physical travel may be unnecessary. For example, the human agent can use a remote connection software application to remotely manipulate the customer's computer system and/or a system that interfaces with the customer's computer.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either both of the following: a) conversion to another language, code or notation; b) reproduction in a different material form.

What is claimed is:

1. A computer program product providing, in a computer readable storage medium, an XForms design software application comprising:
an interactive interface for graphically generating an extensible mark-up language (XML) form compliant with the XForms language;
a validation data store, including a plurality of reusable XPath validation expressions, wherein the interactive interface is configured to permit a user to associate one of the reusable XPath validation expressions with a field of an XML user interface, wherein the association occurs before the field is bound to a data element of an XForms model using a substitution marker, wherein the XForms design software application automatically replaces the substitution marker with a designation for the data element within the reusable XPath validation expression after the field is bound to the data element.

2. The computer program product of claim 1, further comprising:
a re-usable validation expression creation module configured to permit a user of the interactive interface to create a new reusable XPath expression, which is subsequently added to the validation data store.

3. A computer implemented method for validating extensible mark-up language (XML) based XForms fields comprising:
identifying a reusable XPath validation expression including at least one substitution marker;
mapping the at least one substitution marker to variables in an XForms form under development specified by a development tool in a validation definition document associated with the XForms form under development;
designating at least one field to be validated with the reusable XPath validation expression utilizing the development tool;
the development tool automatically replacing the substitution marker with the specified variables; and
generating an XForms form using the development tool, said XForms form including the designated field, wherein in the generated XForms form the development tool automatically replaces the substitution marker with a path specific to the XForms form to create a form-specific XPath validation expression which is integrated into the generated XForms form as a code segment.

4. The method of claim 3, further comprising:
storing a plurality of preconfigured reusable XPath validations in a data store, wherein said identified reusable XPath validation expression is a developer selected one of the plurality of preconfigured reusable XPath validations.

5. The method of claim 4, further comprising:
a user of the development tool creating a new reusable XPath validation; and
adding the new reusable XPath validation expression to said plurality of preconfigured reusable XPath validations.

6. The method of claim 3, wherein the reusable XPath validation expression returns at least one of a TRUE and a FALSE value, the returned value depending upon whether an input associated with the designated field succeeds in being validation.

7. The method of claim 3, wherein the reusable XPath validation expression is included within a validation definition document, said validation definition document including validation metadata, said validation metadata including a validation name, wherein said identifying step identifies the reusable XPath validation by the validation name.

8. The method of claim 3, wherein the development tool includes a form development graphical user interface (GUI), wherein the designating of the at least one field occurs based upon a user selection from within the form development GUI.

9. The method of claim 8, further comprising:
presenting a plurality of reusable XPath validations within said form development GUI;
receiving a user selection of one of the presented reusable XPath validations, wherein the identified reusable XPath validation expression is the user selected reusable XPath validation, and wherein the identifying step occurs responsive to the receiving step.

10. The method of claim 3, wherein the reusable XPath expression is initially stored as a generic expression in a data store associated with the development tool.

11. The method of claim 3, wherein the XForms compliant form includes an XForms compliant user interface and an XForms model.

12. The method of claim 11, wherein said XForms compliant user interface receives input that is to be validated using the reusable XPath validation, and wherein the XForms model includes a data instance field that is to be validated using the reusable XPath validation expression.

13. The method of claim 3, wherein the steps of claim 1 are performed by at least one of a service agent and a computing device manipulated by the service agent, the steps being performed in response to a service request.

14. The method of claim 3, wherein said steps of claim 1 are performed by at least one machine in accordance with at least one computer program having a plurality of code sections that are executable by the at least one machine.

* * * * *